(12) United States Patent
Colson et al.

(10) Patent No.: US 9,407,122 B2
(45) Date of Patent: Aug. 2, 2016

(54) MOTOR HOUSING

(71) Applicant: Hamilton Sundstrand Corporation, Windsor Locks, CT (US)

(72) Inventors: Darryl A. Colson, West Suffield, CT (US); Clarence J. Wytas, Jr., Stafford Springs, CT (US); Murtuza Lokhandwalla, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 207 days.

(21) Appl. No.: 14/231,182

(22) Filed: Mar. 31, 2014

(65) Prior Publication Data

US 2015/0280513 A1  Oct. 1, 2015

(51) Int. Cl.
*H02K 9/00* (2006.01)
*H02K 5/20* (2006.01)
*H02K 5/06* (2006.01)

(52) U.S. Cl.
CPC .. *H02K 5/20* (2013.01); *H02K 5/06* (2013.01); *H02K 2213/03* (2013.01)

(58) Field of Classification Search
CPC .............. H02K 5/00; H02K 5/04; H02K 5/20
USPC ....................................................... 310/89, 54
See application file for complete search history.

(56) References Cited

U.S. PATENT DOCUMENTS

2006/0261686 A1* 11/2006 Rutsyamuka ............ H02K 5/10
                                                          310/53
2012/0011878 A1*  1/2012 Hipsky .................. B64D 13/06
                                                          62/401

* cited by examiner

*Primary Examiner* — Hanh Nguyen
(74) *Attorney, Agent, or Firm* — Cantor Colburn LLP

(57) ABSTRACT

A motor housing includes a central body having a central cavity region configured to receive an electric motor. Also included is a first end portion having a first inner surface that defines a first internal cavity region configured to receive a first end winding of a stator of the electric motor, wherein the first internal cavity region comprises a first radius defined by a distance from a main axis of the motor housing to the first inner surface. Further included is a second end portion having a second inner surface that defines a second internal cavity region configured to receive a second end winding of the stator, wherein a ratio of the first radius to a first end portion wall thickness ranges from 19.89 to 27.85.

13 Claims, 4 Drawing Sheets

MOTOR HOUSING

BACKGROUND OF THE INVENTION

The embodiments herein relate to motor driven compressor assemblies and, more particular, to a motor housing for such an assembly.

Motor driven compressors, which may be used on aircrafts, produce pressurized air for use in various applications. In one application, the pressurized air is routed to air separation modules in nitrogen generation systems for nitrogen enrichment. The nitrogen-enriched air is then distributed into fuel tanks to maintain a required inerting level.

A motor housing for the motor that drives the compressor positions the motor stator and may be damaged upon removal of the stator. Damage to the motor housing during removal and/or installation of the stator undesirably leads to the need for replacement of the motor housing, thereby leading to time and monetary costs. A motor housing that is adequately dimensioned to reduce or eliminate damage to the motor housing during replacement of the stator would be well received in the art.

BRIEF DESCRIPTION OF THE INVENTION

According to one embodiment, a motor housing includes a central body having a central cavity region configured to receive an electric motor and disposed about a main axis defined by the intersection of a first plane and a second plane disposed orthogonal to the first plane. Also included is a first end portion having a first inner surface that defines a first internal cavity region configured to receive a first end winding of a stator of the electric motor, wherein the first internal cavity region comprises a first radius defined by a distance from the main axis of the motor housing to the first inner surface. Further included is a second end portion having a second inner surface that defines a second internal cavity region configured to receive a second end winding of the stator, wherein the second internal cavity region comprises a second radius defined by a distance from the main axis of the motor housing to the second inner surface, wherein a ratio of the first radius to a first end portion wall thickness ranges from 19.89 to 27.85.

According to another embodiment, a motor housing includes a central body having a central cavity region configured to receive an electric motor and disposed about a main axis defined by the intersection of a first plane and a second plane disposed orthogonal to the first plane. Also included is a first end portion having a first inner surface that defines a first internal cavity region configured to receive a first end winding of a stator of the electric motor, wherein the first internal cavity region comprises a first radius defined by a distance from the main axis of the motor housing to the first inner surface. Further included is a second end portion having a second inner surface that defines a second internal cavity region configured to receive a second end winding of the stator, wherein the second internal cavity region comprises a second radius defined by a distance from the main axis of the motor housing to the second inner surface, wherein a ratio of the first radius to a first end portion wall thickness ranges from 19.89 to 27.85, a ratio of the second radius to a second end portion wall thickness ranges from 8.52 to 9.78, and a ratio of a second end portion wall thickness to the first end portion wall thickness ranges from 1.93 to 3.10.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
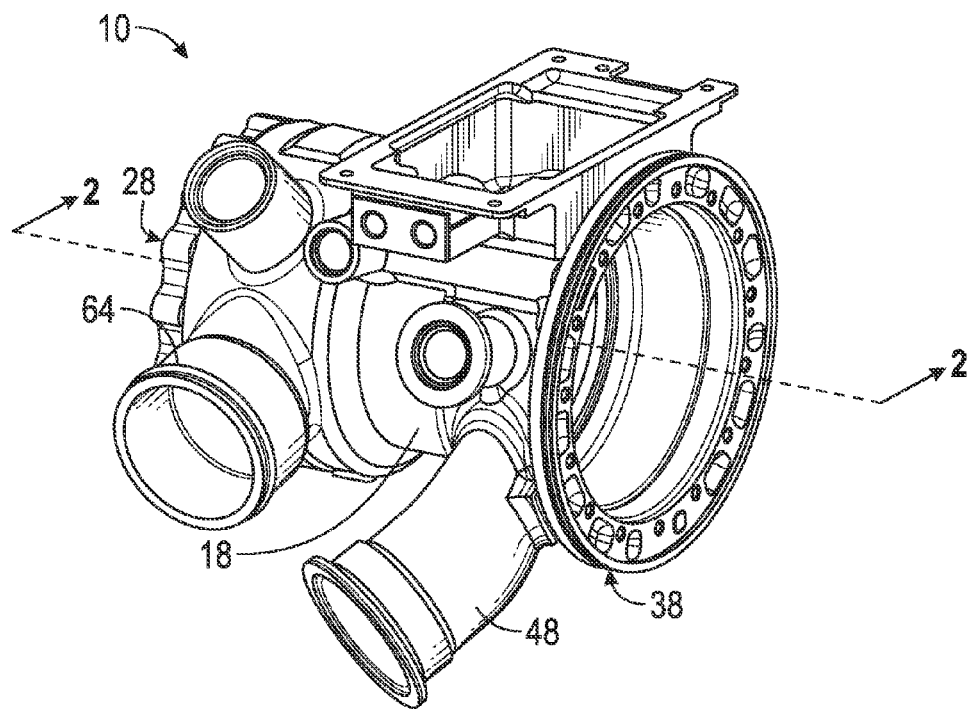
FIG. 1 is a perspective view of a motor housing.
Figure 2:
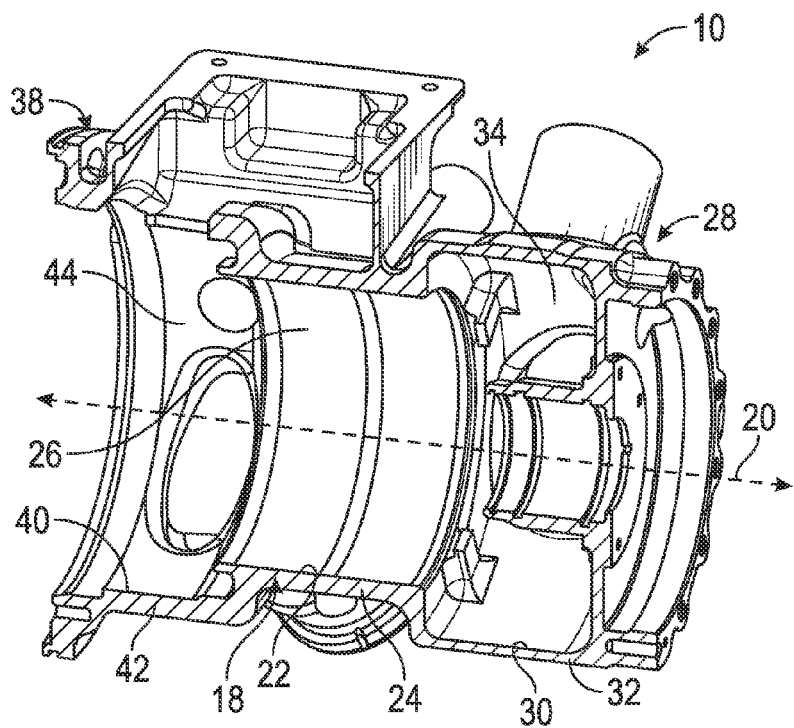
FIG. 2 is a cross-sectional view of the motor housing taken along line 2-2 of FIG. 1.

Referring to FIGS. 1 and 2, a motor housing is illustrated and generally referred to with numeral 10. The motor housing 10 is configured to receive a motor stator 12 (FIG. 3) therein, with the motor of the system configured to be operatively coupled to a compressor (not illustrated) for powering the compressor. In one embodiment, the compressor that the motor housing 10 and motor are associated with is part of a nitrogen generation system, however, it is contemplated that the embodiments of the motor housing 10 and motor stator 12 described herein may be employed with various alternative systems.

Figure 3:
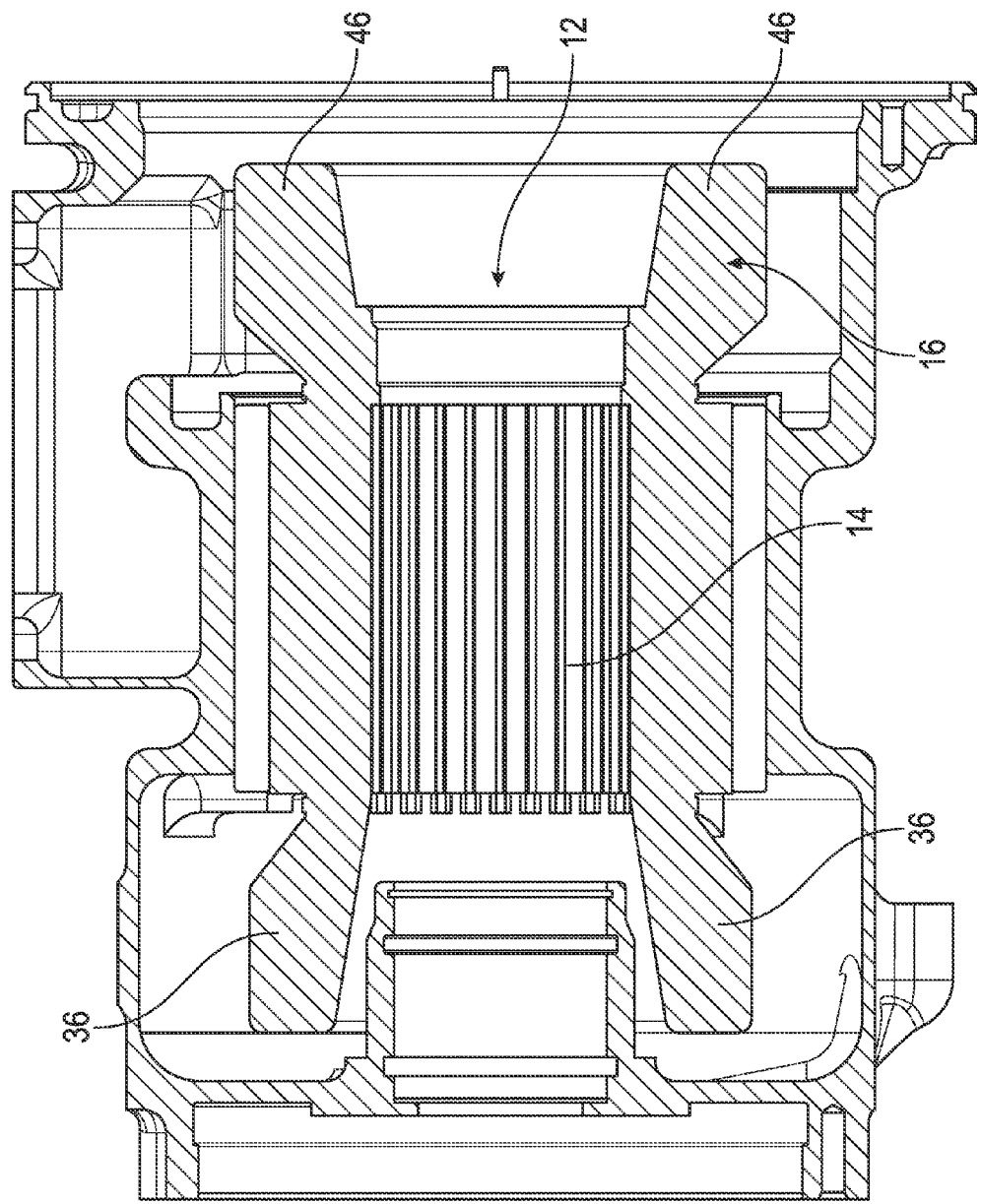
FIG. 3 is a cross-sectional view of the motor housing with a motor stator disposed therein.

Referring to FIG. 3, illustrated is a partial schematic view of the motor stator 12 in an installed position within the motor housing 10. In one embodiment, the motor stator 12 is an electric motor that includes a three-phase stator with a two-pole permanent magnet rotor. As is the case with the compressor and overall system, it is contemplated that alternative types of motors may be included. Irrespective of the precise type of compressor and motor, the motor includes a rotor 14 and a stator having stator end windings 16.

Referring again to FIGS. 1 and 2, the motor housing 10 is illustrated without the motor stator 12 installed therein for clarity. The motor housing 10 includes a central body 18 disposed about a main axis 20 extending in a longitudinal direction of the motor housing 10. An inner surface 22 of a wall 24 of the central body 18 defines a central cavity region 26 that is configured to receive the motor stator 12 therein, and particularly the rotor 14 of the motor. A first end portion 28 of the motor housing 10 includes a first inner surface 30 of a first end portion wall 32 that defines a first internal cavity region 34. The first internal cavity region 34 houses a portion of the motor stator 12, including one end of the stator end windings 16, also referred to as a first end winding 36. The first end portion 28 and, more specifically, the first internal cavity region 34 is disposed about the main axis 20, but has a larger radius than that of the central cavity region 26. A second end portion 38 of the motor housing 10 includes a second inner surface 40 of a second end portion wall 42 that defines a second internal cavity region 44. The second internal cavity region 44 houses a portion of the motor stator 12, including another end of the stator end windings 16, also referred to as a second end winding 46. The second end portion 38 and, more specifically, the second internal cavity region 44 is disposed about the main axis 20, but has a larger radius that that of the central cavity region 26, as is the case with the first internal cavity region 34.

The dimensions of various aspects of the motor housing 10 significantly impact the efficiency and reliability of the overall compressor system that the motor housing 10 and motor are associated with. In particular, unique and specific dimensions for various wall thicknesses of the motor housing 10, as well as various radii of internal cavity regions influence the distance of the motor housing 10 from portions of the motor, such as the stator end windings 16, for example. Additionally, specific wall thicknesses have been found to provide a structure that maintains acceptable motor housing external wall temperatures in the event of a motor stator failure. Such dimensions will be described in detail below.

The first end portion wall 32 includes a wall thickness that ranges from about 0.100 inches (about 0.254 cm) to about 0.140 inches (about 0.356 cm). The radius measured from the main axis 20 to the first inner surface 30 of the first end portion wall 32 is about 2.785 inches (about 7.074 cm). Irrespective of the precise dimensions of the wall thickness of the first end portion wall 32 and the radius associated with the first inner surface 30 of the first end portion wall 32, a ratio of the radius to the first end portion wall thickness ranges from about 19.89 to about 27.85. The second end portion wall 42 includes a wall thickness that ranges from about 0.270 inches (about 0.686 cm) to about 0.310 inches (about 0.787 cm). The radius measured from the main axis 20 to the second inner surface 40 of the second end portion wall 42 is about 2.640 inches (about 6.706 cm). Irrespective of the precise dimensions of the wall thickness of the second end portion wall 42 and the radius associated with the second inner surface 40 of the second end portion wall 42, a ratio of the radius to the second end portion wall thickness ranges from about 8.52 to about 9.78. Irrespective of the precise dimensions of the wall thicknesses of the first end portion wall 32 and the second end portion wall 42, a ratio of the second end portion wall thickness to the first end portion wall thickness ranges from 1.93 to about 3.10.

Figure 4:
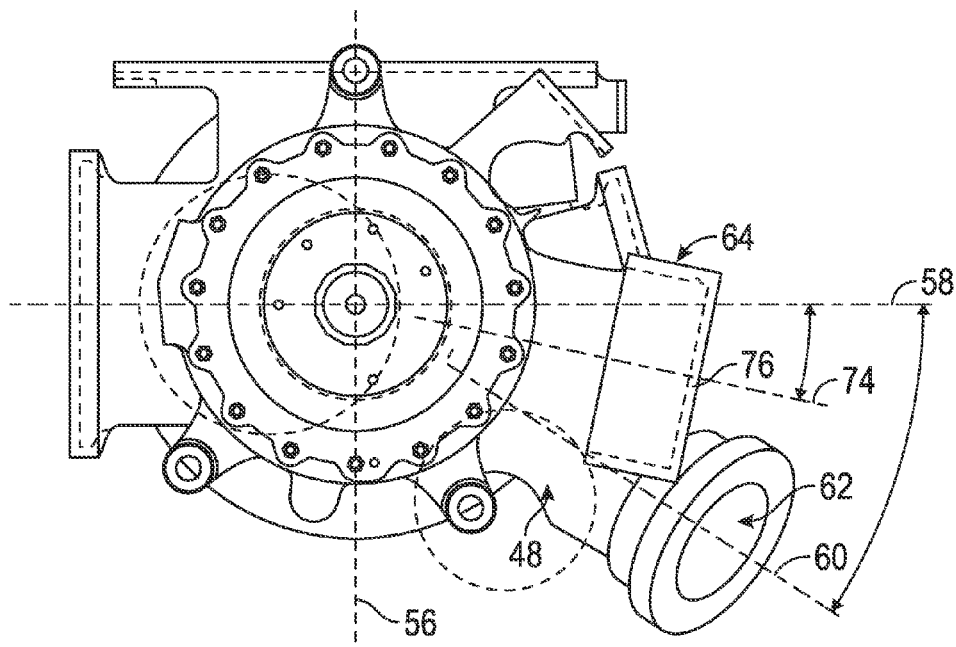
FIG. 4 is an end view of the motor housing.
Figure 5:
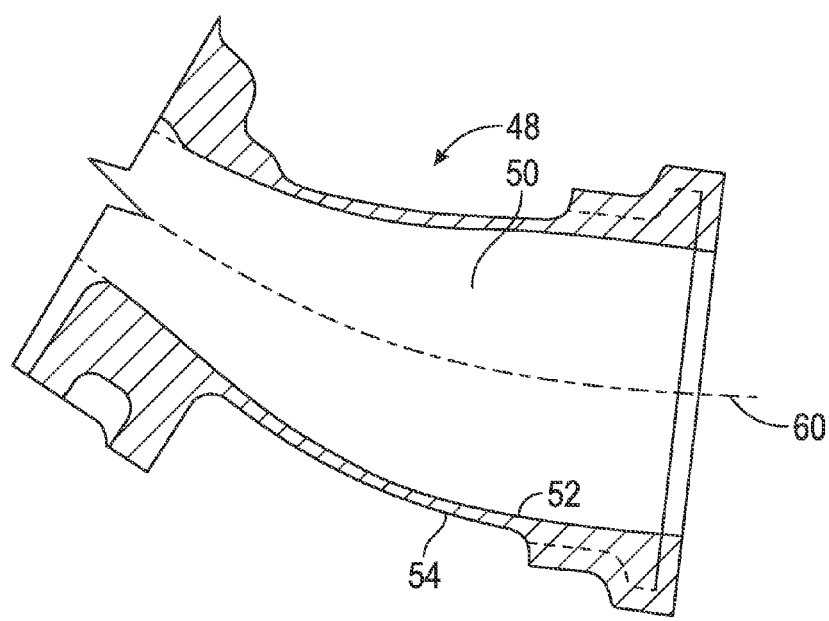
FIG. 5 is a cross-sectional view of a motor cooling inlet duct of taken along line 5-5 of FIG. 4.
Figure 6:
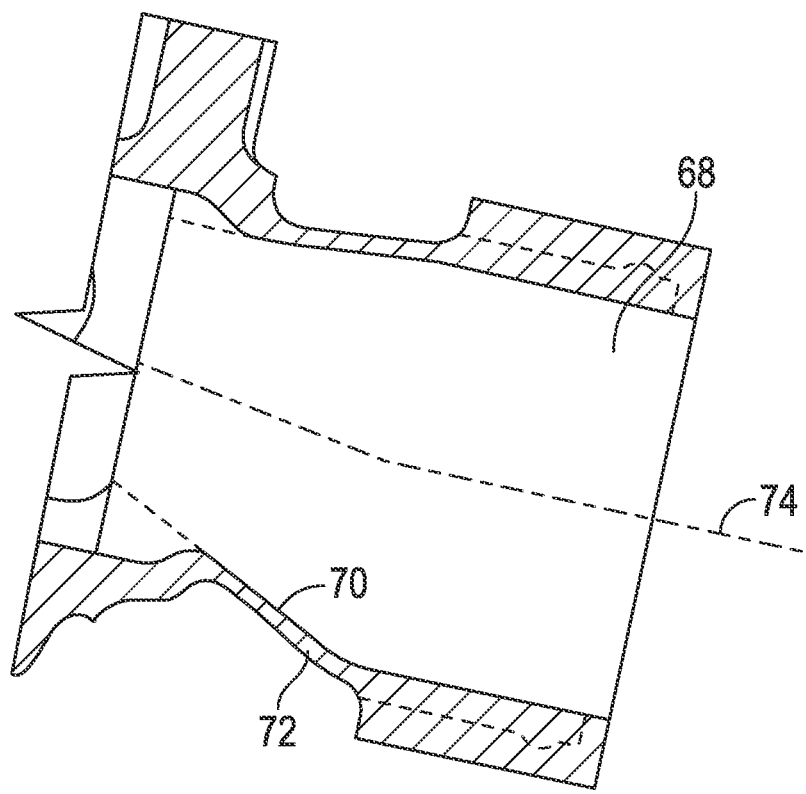
FIG. 6 is a cross-sectional view of the motor cooling outlet duct taken along line 6-6 of FIG. 4

Referring now to FIGS. 4-6, with continued reference to FIGS. 1 and 2, an end view of the motor housing 10 is illustrated with a view of the first end portion 28 closer in proximity than the second end portion 38. The motor housing 10 includes a motor cooling inlet duct 48. In the illustrated embodiment, the motor cooling inlet duct 48 extends from an outer surface of the motor housing 10 proximate the central body 18 and/or the second end portion 38, however, it is contemplated that the motor cooling inlet duct 48 is positioned to extend from any region of the motor housing 10. As illustrated in FIG. 5, the motor cooling inlet duct 48 includes an inlet cavity 50 defined by an inner surface 52 of an inlet duct wall 54. The inlet duct wall 54 includes a wall thickness that ranges from about 0.080 inches (about 2.032 cm) to about 0.120 inches (about 0.305 cm). As best illustrated in FIG. 4, the main axis 20 that extends centrally through the central cavity region 26 in a longitudinal direction of the motor housing 10 is defined by the intersection of a first plane 56 and a second plane 58. The motor cooling inlet duct 48 extends in a curvilinear manner, but a portion of the duct extends along an inlet duct axis 60 that is angled from the main axis 20 by about 33.0 degrees. The inlet duct axis 60 is positioned proximate an inlet region 62 of the motor cooling inlet duct 54.

The motor housing 10 also includes a motor cooling outlet duct 64. In the illustrated embodiment, the motor cooling outlet duct 64 extends from an outer surface of the motor housing 10 proximate the first end portion 28, however, it is contemplated that the motor cooling outlet duct 64 is positioned to extend from any region of the motor housing 10. As illustrated in FIG. 6, the motor cooling outlet duct 64 includes an outlet cavity 68 defined by an inner surface 70 of an outlet duct wall 72. The outlet duct wall 72 includes a wall thickness that ranges from about 0.095 inches (about 0.241 cm) to about 0.135 inches (about 0.343 cm). As discussed above in detail, the main axis 20 that extends centrally through the central cavity region 26 in a longitudinal direction of the motor housing 10 is defined by the intersection of a first plane 56 and a second plane 58. The motor cooling outlet duct 64 extends along an outlet duct axis 74 that is angled from the main axis 20 by about 12.0 degrees. The outlet duct axis 74 is positioned proximate an outlet region 76 of the motor cooling outlet duct 64.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A motor housing comprising:
   a central body having a central cavity region configured to receive an electric motor and disposed about a main axis defined by the intersection of a first plane and a second plane disposed orthogonal to the first plane;
   a first end portion having a first inner surface that defines a first internal cavity region configured to receive a first end winding of a stator of the electric motor, wherein the first internal cavity region comprises a first radius defined by a distance from the main axis of the motor housing to the first inner surface;
   a second end portion having a second inner surface that defines a second internal cavity region configured to receive a second end winding of the stator, wherein the second internal cavity region comprises a second radius defined by a distance from the main axis of the motor housing to the second inner surface; and
   wherein a ratio of the first radius to a first end portion wall thickness ranges from 19.89 to 27.85, wherein a ratio of the second radius to a second end portion wall thickness ranges from 8.52 to 9.78, the radius to wall thickness ranges spacing the first and second inner surfaces from the respective end windings of the stator to avoid damaging the motor housing during installation or removal of the electric motor, wherein a ratio of a second end portion wall thickness to the first end portion wall thickness ranges from 1.93 to 3.10, the distinct wall thicknesses providing distinct thermal insulation requirements.

2. The motor housing of claim 1, wherein the first end portion wall thickness ranges from 0.100 inches to 0.140 inches and the first radius is 2.785 inches.

3. The motor housing of claim 1, wherein a ratio of the second radius to a second end portion wall thickness ranges from 8.52 to 9.78.

4. The motor housing of claim 1, further comprising a motor cooling inlet duct having an inlet cavity defined by an inner surface of an inlet duct wall.

5. The motor housing of claim 4, wherein the inlet duct wall comprises an inlet duct wall thickness ranging from about 0.080 inches to about 0.120 inches.

6. The motor housing of claim 4, wherein the motor cooling inlet duct extends from the second end portion along an inlet duct axis that is angled from the main axis by 33.0 degrees.

7. The motor housing of claim 1, further comprising a motor cooling outlet duct having an outlet cavity defined by an inner surface of an outlet duct wall.

8. The motor housing of claim 7, wherein the outlet duct wall comprises an outlet duct wall thickness ranging from 0.095 inches to 0.135 inches.

9. The motor housing of claim 7, wherein the motor cooling outlet duct extends from the first end portion along an outlet duct axis that is angled from the main axis by 12.0 degrees.

10. A motor housing comprising:
   a central body having a central cavity region configured to receive an electric motor and disposed about a main axis defined by the intersection of a first plane and a second plane disposed orthogonal to the first plane;
   a first end portion having a first inner surface that defines a first internal cavity region configured to receive a first end winding of a stator of the electric motor, wherein the first internal cavity region comprises a first radius defined by a distance from the main axis of the motor housing to the first inner surface;
   a second end portion having a second inner surface that defines a second internal cavity region configured to receive a second end winding of the stator, wherein the second internal cavity region comprises a second radius defined by a distance from the main axis of the motor housing to the second inner surface; and
   wherein a ratio of the first radius to a first end portion wall thickness ranges from 19.89 to 27.85, a ratio of the second radius to a second end portion wall thickness ranges from 8.52 to 9.78, the radius to wall thickness ranges spacing the first and second inner surfaces from the respective end windings of the stator to avoid damaging the motor housing during installation or removal of the electric motor, and a ratio of a second end portion wall thickness to the first end portion wall thickness ranges from 1.93 to 3.10, the distinct wall thicknesses providing distinct thermal insulation requirements.

11. The motor housing of claim 10, further comprising:
   a motor cooling inlet duct having an inlet cavity defined by an inner surface of an inlet duct wall; and
   an outlet duct having an outlet cavity defined by an inner surface of an outlet duct wall.

12. The motor housing of claim 11, wherein the inlet duct wall comprises an inlet duct wall thickness ranging from about 0.080 inches to about 0.120 inches.

13. The motor housing of claim 11, wherein the outlet duct wall comprises an outlet duct wall thickness ranging from 0.095 inches to 0.135 inches.

* * * * *